April 27, 1954
C. T. ASBURY
2,676,447
LAWN EDGER ATTACHMENT
Filed July 18, 1950
2 Sheets-Sheet 1
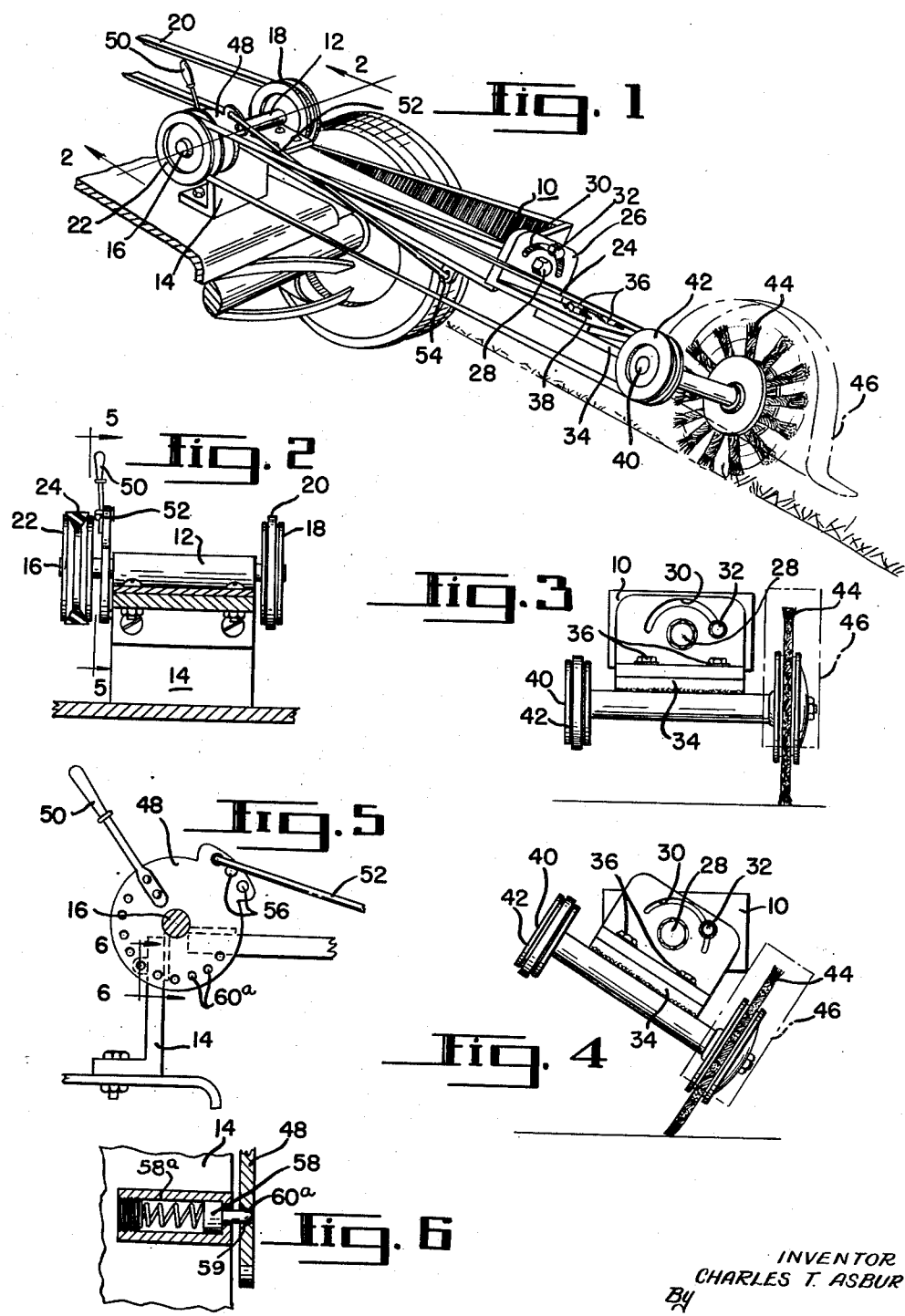
INVENTOR
CHARLES T. ASBURY
BY
Toulmin & Toulmin
ATTORNEYS.

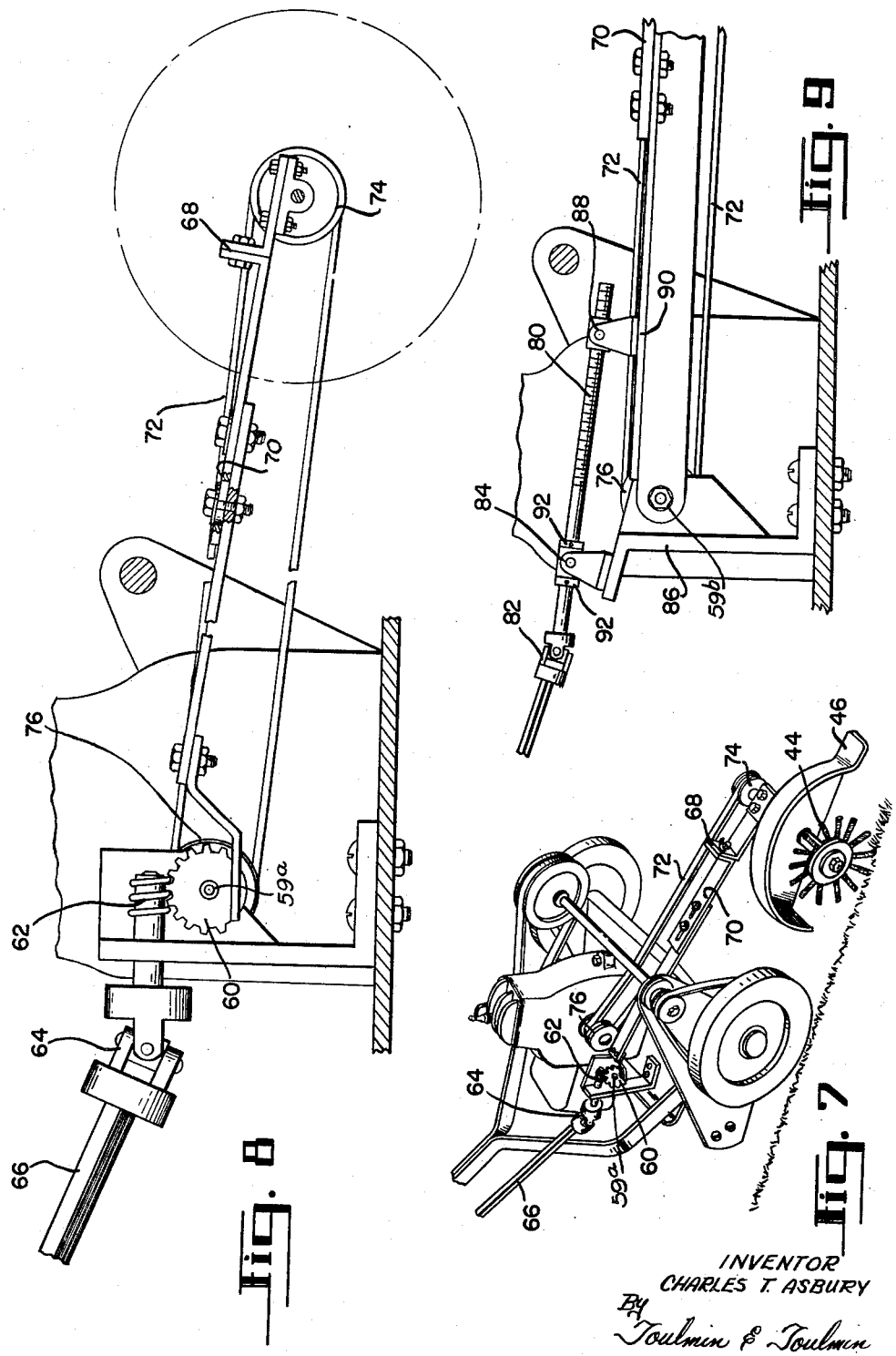

Patented Apr. 27, 1954

2,676,447

UNITED STATES PATENT OFFICE 2,676,447

LAWN EDGER ATTACHMENT

Charles T. Asbury, Fort Lauderdale, Fla., assignor to Asbury Corporation, Wilmington, Del., a corporation of Delaware Application July 18, 1950, Serial No. 174,392

4 Claims. (Cl. 56—25.4)

This invention relates to a device for edging lawns and the like.

As is well known, in order to do a complete and proper job of mowing a lawn, it is necessary not only to mow the lawn, but to give it special treatment along the edges of sidewalks, driveways, flower beds, hedgerows, and the like. This special treatment usually consists of edging the lawn by trimming off the grasses that are not caught by the lawnmower, and otherwise so treating the lawn so as to provide a sharp edge which adds materially to the appearance of the lawn when completed.

Numerous devices have been and are manufactured and sold for the purpose of edging the lawns in the manner described above, but heretofore these devices have all been lacking in one or more respects.

A number of the devices comprise a unitary mechanism having no other purpose than that of edging the lawn. This, of course, is not the most desirable situation because considerable expense is involved in providing a single purpose tool, and it is only on very large lawns that such an expenditure is justified.

Other devices have been proposed which are permanently mounted in combination with a lawnmower, but devices of this nature have not always been satisfactory, due to the fact that it is not always desired to have them on the mower, and, furthermore, they have been quite expensive and generally not well designed for the purpose to which they are to be put.

Having the foregoing in mind, it is a primary object of the present invention to provide a lawn edging device or the like which eliminates the difficulties referred to above that have obtained with similar devices as constructed according to the prior art.

Another particular object of the present invention is to provide a lawn edging device which can readily be attached to an ordinary power mower, thereby providing for a relatively inexpensive attachment device rather than requiring that a complete piece of equipment be purchased.

It is a still further object of the present invention to provide a lawn edging device or the like which is light but which nevertheless is extremely efficient in use and which has long life.

A particular object of the present invention is to provide an edging device for lawns and the like which is capable of being used with a plurality of different types of edging tools.

Still another particular object of this invention is the provision of a lawn edging device or the like which utilizes a self-sharpening wire brush as the edging implement.

A further object of the present invention is the provision of a lawn edging device which can readily be attached to or detached from the usual type of power mower and which is highly flexible so as to be useful under a plurality of different circumstances.

These and other objects and advantages will become more apparent upon reference to the following description taken in connection with the accompanying drawings, in which:

Figure 1 is a perspective view of one form of a lawn edging tool according to my invention and shows the edging device mounted on a power mower;

Figure 2 is a sectional view indicated by line 2—2 on Figure 1 and shows the appearance of the edging device at the drive pulley end thereof;

Figure 3 is an end view of a device looking in from the right end of Figure 1;

Figure 4 is a view like Figure 3, but showing the tool end of the device tilted;

Figure 5 is a sectional view indicated on line 5—5 of Figure 2 and showing one form of adjustment for raising and lowering the working end of the device;

Figure 6 is an enlarged view taken on line 6—6 of Figure 5 showing a detent mechanism forming a part of the adjusting device of Figure 5;

Figure 7 is a reduced perspective view showing another form of a device according to my invention;

Figure 8 is a side elevational view of the device of Figure 7 but drawn at somewhat enlarged scale; and Figure 9 is a view similar to Figure 8 but showing still another arrangement for adjusting the working end of the device in a vertical plane.

Referring to the drawings somewhat more in detail, and particularly to Figures 1 through 6, the edging device according to my invention comprises an elongated beam member, indicated at 10, which has at its rear end pivot means 12 by means of which it is secured to a bracket 14 adapted for being detachably mounted, as illustrated in Figure 1, on a power mower.

Extending through pivot means 12 is an axle 16 having a pulley 18 on one end over which runs the V-belt 20 that is driven by the source of power for the mower. On the other end of shaft 16 is a pulley 22 over which passes the V-belt 24, the purpose of which is to drive the rotating edging tool on the forward end of beam 10.

Beam 10 is preferably formed in two parts, the first part being attached to the power mower as described, and the forward part which supports the edging tool being pivoted to the rear part on an axis extending longitudinally of the beam. The forward part comprises the angular end portion 26 which is pivotally retained on the end of the rear part of the beam by pivot bolt 28. A slot 30 in part 26 and clamping bolt 32 extending through the slot permit the forward end of the beam to be tilted to any predetermined angle and rigidly clamped in whatever position of adjustment it is placed.

The forward part of the beam is preferably divided into two parts with the forward part being indicated at 34. This part is adjustable longitudinally of the beam by virtue of slots 38 therein through which the clamping bolts 36 pass. This last-mentioned adjustment permits the tool end of the beam to be adjusted so that belt 24 is maintained in proper engagement with pulley 42 mounted on shaft 40 that is journaled in the extreme forward end of the beam, and which also mounts the edging tool 44.

Edging tool 44 is preferably shielded by the shield member 46, as illustrated. Edging tool 44 is illustrated as a tufted or knotted wire brush, and this particular form of rotary cutting element is preferred because of its self-sharpening characteristics and because, in addition to cutting, it also has a brushing and cleaning action that exceeds that obtainable by straight cutting members. However, it will be apparent that disks having smooth or serrated peripheries could also be used in place of the brush illustrated and would work satisfactorily in many instances.

I have also found that a swing hammer type of suspension works quite well for supporting the rotary cutting member on the end of the beam. Accordingly, the arrangement illustrated is the one to be preferred, but is by no means the only arrangement that can be made of the cutting member to produce satisfactory results.

As previously mentioned, the beam 10 is pivotally supported at its rear end at 12 on the bracket 14 that is secured to the mower. The beam 10 is adapted for being raised and lowered about this pivotal connection by an adjusting device that is best seen in Figures 2, 5, and 6. This adjusting device comprises a plate 48 pivotally mounted about the axis of shaft 16 and having a hand lever 50 by means of which it can be tilted to any predetermined angle of adjustment.

A link 52 is connceted at 54 to beam 10 at its forward end and is adapted for having its rear end connected into any one of a number of apertures 56 in the periphery of plate 48.

For retaining plate 48 in any of its adjusted positions, there is a spring pressed detent 58 carried by bracket 14. The detent 58 is urged outwardly by the spring 58ª to cause the integral end part 59 to enter one of the apertures 60ª circumferentially arranged on the plate. In this manner the beam can be adjusted to raise and lower the tool end thereof. This adjustment, taken in combination with the pivotal mounting of the tool end part of the beam, provides for a high degree of flexibility and permits the edging tool to be presented to the work at any angle and at any elevation.

At the same time, due to the fact that beam 10 pivots about the axis of a shaft 16, the drive belt 24 always remains in proper driving engagement with the pulleys over which it passes.

In Figures 7 and 8 substantially the same arrangement is illustrated, except that the elevating mechanism for raising and lowering the device about the pivotal axis 59ª comprises the worm gear 60 which is engaged by the worm 62 adapted for being driven through the universal coupling 64 by shaft 66 extending to the operator's position at the handle of the machine. By this arrangement, the operator has precise control of the position of the edger at all times and can manipulate it to suit the particular work being done.

The arrangement of Figures 7 and 8 also positions the pivot means 68 about which the tool end of the beam can be tilted relative to the other part forwardly of the adjustment at 70 by means of which the drive belt 72 passing over the tool drive pulley 74 and the motor driven pulley 76 can be kept taut.

In other respects the arrangement of Figures 7 and 8 can be considered to be the equivalent of that described in detail for Figures 1 through 6.

In Figure 9 there is illustrated a somewhat modified construction as shown in Figures 7 and 8 wherein there is a threaded member 80 that is connected through the flexible coupling 82 with a rod leading to the handle of the mower so the screw can be rotated by the operator at will to tilt the device about the pivotal axis 59ᵇ. A first block 84 is trunnion mounted on the stationary frame 86 of the device and a second block 88 is trunnion mounted on the beam 90 of the device. The threaded rod 80 is threaded through one of the blocks and is rotatable in the other thereof while being restrained against axial movement therein, as by means of the collars 92.

It will be apparent that rotation of the threaded rod will bring about raising or lowering of the brush end of the device. Optionally, the rod may have its opposite ends oppositely threaded and be threaded into both of the trunnion mounted blocks.

It is to be observed that the edging device according to my invention is in the form of an attachment that can be secured to or removed from a power mower. For this reason, it is substantially more inexpensive to purchase than the usual type edging device which is a complete tool in itself.

The edging device according to my invention does not interfere with the operation of the mower in any way and can be brought into operation or put in inoperative condition at any time. Due to the extreme flexibility of the mounting of the device, it can be used for edging along drives and sidewalks, for edging along flower beds and the like, or for brushing out trenches and along corners in cement work, such as curbs and the like.

It will be understood that this invention is susceptible to modification in order to adapt it to different usages and conditions, and, accordingly, it is desired to comprehend such modifications within this invention as may fall within the scope of the appended claims.

I claim:

1. In a lawn edging tool attachment of the type described; a bracket, a beam having its rear end pivoted to said bracket for movement in a vertical plane and having an edging tool mounted on its other end, and means for tilting said beam about its pivotal connection with said bracket in a vertical plane comprising a first block pivotally mounted on said bracket, a second block pivotally mounted on said beam, a threaded rod engaging said blocks and screw threaded to at least one thereof whereby rotation of said rod will draw said blocks toward or away from each other to tilt said beam, and means comprising a shaft operatively connected to said rod for rotating the same.

2. A lawn edging attachment for power lawn mowers, said attachment comprising a frame adapted to be removably fastened to said lawn mower, a beam pivotally mounted at one end on said frame, an edging tool rotatably mounted on the opposite end of said beam, means for drivingly connecting said edging tool to the power source of said lawn mower for operation thereof, said edging tool being adjustably mounted on said beam for presenting said tool to the work at different angles, means for retaining said edging tool in fixed adjusted position, and means carried by said frame for tilting said beam about its pivotal axis to raise or lower said edging tool while retaining said tool drivingly connected to said power source.

3. A lawn edging attachment for power lawn mowers, said attachment comprising a frame adapted to be removably fastened to said lawn mower, a beam pivotally mounted at one end on said frame, an edging tool rotatably mounted on the opposite end of said beam, means for drivingly connecting said edging tool to the power source of said lawn mower for operation thereof, said beam comprising a longitudinally movable forward section, said section carrying said edging tool, said section being rotatable about its longitudinal axis for angularly adjusting said edging tool for presenting the same to the work at different angles, means for retaining said edging tool in fixed adjusted position, and means carried by said frame for tilting said beam about its pivotal axis to raise or lower said edging tool while retaining said tool drivingly connected to said power source.

4. A lawn edging attachment for power lawn mowers, said attachment comprising a frame adapted to be removably fastened to said lawn mower, a beam pivotally mounted at one end on said frame, an edging tool rotatably mounted on the opposite end of said beam, means for drivingly connecting said edging tool to the power source of said lawn mower for operation thereof, said beam being divided intermediate its length, means for rotatably securing the front end of said beam to the rearward part of said beam, means for adjustably positioning said forward portion of said beam carrying said edging tool for presenting said tool to the work at different angles, means for retaining said edging tool in a fixed adjusted position, and means carried by said frame for tilting said beam about its pivotal axis to raise or lower said edging tool while retaining said tool drivingly connected to said power source.

References Cited in the file of this patent

UNITED STATES PATENTS

| Number | Name | Date |
| --- | --- | --- |
| 290,865 | Dawson | Dec. 25, 1883 |
| 1,167,051 | Doak | Jan. 4, 1916 |
| 1,189,519 | Word | July 4, 1916 |
| 1,890,810 | Gast | Dec. 13, 1932 |
| 2,082,610 | Bankson | June 1, 1937 |
| 2,139,353 | Bruder | Dec. 6, 1938 |
| 2,310,152 | Ronning | Feb. 2, 1943 |
| 2,439,607 | Irwin | Apr. 13, 1948 |
| 2,461,188 | Stoner | Feb. 8, 1949 |
| 2,462,314 | Fuqua | Feb. 22, 1949 |
| 2,480,877 | Peterson | Sept. 6, 1949 |
| 2,489,383 | May | Nov. 29, 1949 |
| 2,514,593 | Velotta | July 11, 1950 |
| 2,515,732 | Parry | July 18, 1950 |
| 2,521,033 | Bell | Sept. 5, 1950 |
| 2,538,230 | Boggs | Jan. 16, 1951 |
| 2,618,919 | Hutchens | Nov. 25, 1952 |